(12) United States Patent
Silvernail et al.

(10) Patent No.: US 7,768,548 B2
(45) Date of Patent: Aug. 3, 2010

(54) MOBILE DIGITAL VIDEO RECORDING SYSTEM

(76) Inventors: William Bradford Silvernail, 714 Graham St., Raleigh, NC (US) 27605; Jody Snow, 105 Jordan Cir., Garner, NC (US) 27529; John Glenn, 1908 Larkspur La., Hillsborough, NC (US) 27278; David Ridgway, 5570 Hamstead Crossing, Raleigh, NC (US) 27612; Joseph Huang, 335 Bond Lake Dr., Cary, NC (US) 27513; Christopher Church, 5042 Mineral Springs Mountain Rd., Connelly Springs, NC (US) 28612; Olivier Singla, 3005 Moretz Ct., Apex, NC (US) 27502; Paul Kehle, 1424 Laughridge Dr., Cary, NC (US) 27511

( * ) Notice: Subject to any disclaimer, the term of this patent is extended or adjusted under 35 U.S.C. 154(b) by 1302 days.

(21) Appl. No.: 11/269,636

(22) Filed: Nov. 9, 2005

(65) Prior Publication Data

US 2007/0035632 A1 Feb. 15, 2007

Related U.S. Application Data

(60) Provisional application No. 60/707,523, filed on Aug. 12, 2005.

(51) Int. Cl.
*H04N 7/18* (2006.01)
(52) U.S. Cl. .................. 348/148; 348/117; 348/118; 348/123; 348/152
(58) Field of Classification Search ................ 348/117, 348/118, 123, 124, 148, 152, 211.1–211.15; 701/35
See application file for complete search history.

(56) References Cited

U.S. PATENT DOCUMENTS

| | | | | |
|---|---|---|---|---|
| 5,815,093 | A * | 9/1998 | Kikinis | 340/937 |
| 5,974,349 | A | 10/1999 | Levine | |
| 5,983,161 | A | 11/1999 | Lemelson et al. | |
| 6,389,337 | B1 | 5/2002 | Kolls | |
| 6,389,340 | B1 * | 5/2002 | Rayner | 701/35 |
| 6,518,881 | B2 | 2/2003 | Monroe | |
| 6,545,601 | B1 | 4/2003 | Monroe | |
| 6,559,769 | B2 | 5/2003 | Anthony et al. | |
| 6,636,256 | B1 | 10/2003 | Passman et al. | |
| 6,721,640 | B2 | 4/2004 | Glenn et al. | |
| 6,791,472 | B1 | 9/2004 | Hoffberg | |
| 6,798,343 | B2 | 9/2004 | Carrier et al. | |
| 6,850,510 | B2 | 2/2005 | Kubler et al. | |
| 6,853,894 | B1 | 2/2005 | Kolls | |
| 6,873,261 | B2 * | 3/2005 | Anthony et al. | 340/574 |
| 6,877,694 | B2 | 4/2005 | Gonzalez | |
| 6,894,717 | B2 | 5/2005 | Bakewell | |
| 6,895,310 | B1 | 5/2005 | Kolls | |
| 7,190,882 | B2 * | 3/2007 | Gammenthaler | 386/107 |

(Continued)

*Primary Examiner*—Yogesh K Aggarwal
*Assistant Examiner*—Selam Gebriel
(74) *Attorney, Agent, or Firm*—John L. Sotomayor (57) ABSTRACT

The Improved Mobile Digital Video Recorder (IMDVR) system is a ruggedized, multiple camera video and audio recording system that is installed within a public transit vehicle to record, store, and manage an integrated data stream of data captured within and exterior to the transit vehicle. The system is focused on multiple person vehicles and the capture of an integrated data stream for use in transit security, liability, and evidentiary processes.

22 Claims, 4 Drawing Sheets

IMDVR System Diagram

U.S. PATENT DOCUMENTS 7,511,612 B1 * 3/2009 Monroe ...................... 340/521
7,551,075 B1 * 6/2009 Monroe ...................... 340/521
2005/0083404 A1 * 4/2005 Pierce et al. ................. 348/148
2005/0088291 A1 * 4/2005 Blanco et al. ............... 340/441

* cited by examiner

Figure 1: IMDVR System Diagram

Figure 2: Component Diagram

Figure 3: System Software Components

FIG 4: Control Process Flow Diagram

MOBILE DIGITAL VIDEO RECORDING SYSTEM

PRIORITY

This application claims the benefit of priority to U.S. Provisional Application 60/707,523, filed Aug. 12, 2005.

TECHNICAL FIELD

The $2^{nd}$ Generation Mobile Digital Video Recorder (MDVR) is referred to as the Improved Mobile Digital Video Recorder system or TransitCAM Platform. The TransitCAM Platform consists of the MDVR and all possible components and configurations necessary to support safety and surveillance activities requiring audio, video, and transaction data of evidentiary quality. Various configurations of the Transit-CAM platform will serve two primary markets, Public Safety and Transit. This document defines the Product Design Specification for the TransitCam Product developed by Integrian, Inc. The TransitCam product is focused on the Transit market—Municipal Bus, Commuter Rail/Light Rail and ParaTransit/School Bus—with a priority on the safety and surveillance needs of the Municipal Bus market.

BACKGROUND

This invention relates generally to a mobile security system for mass transit vehicles in which multiple cameras capture a plurality of images that are integrated with sound and data of interest and saved to a storage device. The cameras continuously record images from a plurality of directions and points of view that are of interest in protecting the vehicle and the occupants of the vehicle, monitoring the interior of the mass transit vehicle, and providing a video, audio, and data record of events that are preset as trigger events, such as a collision.

Installing a camera in a security vehicle such as a patrol car is known in the art. Attaching a digital video recorder to capture video, audio and text is also know as is shown in U.S. Pat. No. 6,831,556, issued to Boykin et al. However, these systems are intended to provide a record of activities that are from a single point of view, that of the operator of the patrol car, that may be used later in evidentiary proceedings. The systems in the prior art do not address multiple points of view within and surrounding vehicles composed of multiple components, such as those composing a train, or that are more that 40 feet long. Prior art systems also do not address data streams integrated together to provide a complete picture of all activities occurring within the viewing envelope, a continuous record of all imagery, sound, and data for said envelope of interest, with all of the information stored in digital media for real time and after-the-fact viewing by interested parties, such as a transit supervisor or security expert.

The Improved Mobile Video Recordation System addresses the shortcomings in the prior art with innovations that develop and hold a defensive audio and video envelope for the protection and safety of the users of a mass transit vehicle. In addition, the imagery data, including audio and other types of data, is continuously recorded to a storage device, with higher quality video automatically stored as the result of a trigger event.

The present invention is an elegant solution to the problems inherent in systems that are designed as an adjunct to law enforcement activities and not intended for the broader needs of private companies and agencies charged with providing for the safety and security of users of all types of mass transit.

SUMMARY OF THE INVENTION

The Improved Mobile Digital Video Recording (IMDVR) System was created as a means to provide for security and safety for users of all types of mass transit systems. The primary means for gathering information about the interior and immediate exterior proximity of the mass transit vehicle is through the use of from two to eight video cameras and a plurality of audio microphones per vehicle or car. The input audio and video data information from these devices is synchronized and combined with data from other input devices that gather operational, control, maintenance, analytic and telemetry data to produce an integrated information data stream. This integrated information data stream is stored in real-time to hi-capacity storage devices installed within a mass transit vehicle, and, in addition, to hi-capacity storage devices located external to the mass transit vehicle. Transfer of the integrated information stream to an external hi-capacity storage device is effected through wired or wireless communication channels.

Power is provided to the system from the vehicle power source. The power system includes a separate battery, which is used for smoothing the power profile to the IMDVR system, and emergency charger to insure continuous operation of the recording function. The power supply system also includes a software controlled voting function that decides whether to supply power to the IMDVR from the vehicle source or the battery backup based upon the instant power profile. The power supply system is responsible for adjusting input power to provide a plurality of voltage levels required by the various sub-systems within the IMDVR.

The primary mission of the IMDVR is to capture continuous video, audio, data and meta-data information from the moment the system comes online until some time after the vehicle is shut down, said time span being configurable by the user. In support of this mission, the IMDVR utilizes two modes for recording—normal mode and an event mode. Each mode records two separate integrated data streams simultaneously with one integrated data stream recoded in low-resolution and a second integrated data stream recorded in high-resolution. The definitions of low-resolution and high-resolution are user configurable and dependent upon the frame rate, bit rate, and image resolution chosen for each level of resolution, however, low-resolution is configured to result in a smaller storage file size than high-resolution.

In normal mode, the low-resolution integrated data stream is saved to the on-board high-capacity storage device in non-erasable data files, and the high-resolution integrated data stream is saved to a portion of the high-capacity storage device that has been constructed as a ring buffer with a configurable storage limit. The storage limit may be set to hold between 1 and 180 seconds of continuous recording of the high-resolution integrated data stream. At the end of the configurable storage limit, the data stored at the beginning of the buffer is overwritten with the most current data from the integrated data stream. This process continues with the most current data overwriting the next position in the buffer such that the buffer always contains the most recent recording of the integrated data stream. This circular buffer therefore contains the most recent 1 to 180 seconds of the high-resolution integrated data stream.

Event mode is triggered by a plurality of pre-set events, such as notification by an integral rules engine that a certain speed has been exceeded, a crash has occurred, or the driver hits a panic button, for example, or multiple events such as the opening of a vehicle door when the speed is greater than zero. In event mode, the high-resolution integrated data stream is redirected from the circular buffer directly to the high-capacity storage device in place of the low-resolution integrated data stream. In addition, the circular buffer, containing the previous 1 to 180 seconds of the high-resolution integrated data stream is prepended to the data files created on the high-capacity storage device such that the data from the integrated data stream record now contains a full data record from the configurable time prior to the trigger event until the event mode times out. At which time the IMVDR system returns to normal mode recording.

The IMVDR system internal communication is supported by the MDVR data bus and the Inter-Integrated Circuit (I²C) bus. The I²C bus communicates with the General Purpose Input/Output (GPIO) controller and systems external to the IMDVR that provide data or control information critical to the operation of the IMDVR. These systems include sensing ignition of the mass transit vehicle, the real-time clock, a Global Positioning System (GPS) input, vehicle forward/reverse and speed sense, etc. The MDVR data bus provides communication between all other components of the IMVDR system.

The IMVDR communicates stored data files to an external high-capacity storage and retrieval server through wired or wireless communication channels. In wired mode, a user may attach an Ethernet cable to an Ethernet port integrated into the front or rear panel of the IMVDR or, optionally, retrieve the removable on-board high-capacity storage device. If an Ethernet connection is established, data files are transmitted from the on-board high-capacity storage device to the external server, which then saves the files to the high-capacity storage device on the external server. If the removable on-board high-capacity storage device is removed it is then docked with the external server and the files downloaded into the high-capacity storage device on the external server. In wireless mode, the IMDVR establishes a network communication path with an external server through the use of an integral wireless modem. Once the wireless communication path is established, data files are transmitted from the on-board high-capacity storage device to the external server, which then saves the files to the high-capacity storage device on the external server.

In addition to the input data streams from video and audio devices, the IMVDR provides standard connectors for a plurality of external systems. These connectors include DB9 and Universal Serial Bus (USB) connectors for attaching external devices to support the mission of the IMDVR. For example, these devices can include a monitor, keypad, output from intra-vehicle data sources such as the Society of Automotive Engineers (SAE) J1708 and J1939 buses, or other devices deemed necessary to the optimal operation of the IMVDR.

The invention also involves a computer server and software modules required to configure, operate, maintain, and administer the IMVDR system.

DETAILED DESCRIPTION

The functionality can be seen split between the MDVR 100 and the power supply 300 unit. There is a serial communications link between the two components for accessing and controlling the various functions. This interface is a 2-wire serial interface.

Real Time Clock Operation

The real-time clock 502 and associated battery are located in the power supply unit 300. Access to clock functions will be over an I²C interface 500 to the Power Supply Processor (PSP) 501. The real time clock 502 is polled at power up to set the time for the system. The real time clock can be updated through GPS time data or Network Time Protocol (NTP) during docking. Standard functions include current time and current date. If the MDVR 100 is off, a periodic, repeatable, wake-up alarm (with configurable duration) is used to implement a "wake up and look" scheme for the WiFi interface.

Accelerometer Operation

The Accelerometer will be located in the MDVR 100 unit. It is a single 3-axis device accessed by the PSP 501 over the I²C bus 500. The accelerometer will measure at minimum 3G with a 0.01 G resolution.

The accelerometer can be pre-configured with a threshold. If this threshold is exceeded the PSP 501 will be notified and in turn the PSP 501 will notify the GPP 101 so that appropriate action can be taken. Polling of the accelerometer by the PSP 501 will occur at a maximum of 10 milliseconds.

GPS Operation

The GPS module 610 will be mounted externally to the power supply 300. The electrical interface will be via the DB-15 connector located on the power supply interface board.

The GPP 101 will communicate directly with the GPS module 610. The module will generate location messages as well as data reliability information so that an assessment of the readings can be made in software. These will include signal strength, EPE, number of satellites, etc.

The GPS 610 incorporates Dead Reckoning (DR) as not only a backup for positioning when satellites are not in view, but also as a sanity check for GPS information in urban canyon environments. To accomplish the DR function, a gyroscope will be used. The gyroscope can accurately measure inertial changes in the X and Y axis. Since the unit can be mounted in either the horizontal or the vertical plane, the gyroscope must also be mounted with the X and Y axis in the horizontal plane.

General Purpose Input/Output (GPIO) Operation

Twelve general purpose inputs 612 are provided to interface external trigger devices to the system. These inputs are read over the I²C bus 500 of the PSP 501. Through configuration, the inputs can be set for either active high or active low operation.

Three general purpose outputs are provided to control devices external to the system. Control of these devices is accomplished via on board relays. Relay contacts are rated for 24 VDC at a maximum current of 1.0 amp.

Control of outputs and notification of input triggers is accomplished by the PSP 501 and passed to and from the GPP 101 over the serial interface.

Access to the GPIO 600 is done through the terminal block connected to the DB-37 connector on the power supply.

Power Supply Operation

The power supply 300 generates all primary power used by the system. In consists of six switching power supplies, generating 9.5 VDC 308, 3.3 VDC 306, 1.4 VDC 305, 1.5 VDC 307, 5.0 VDC 304 and 12.0 VDC 303. These power supplies are enabled/disabled by a microcontroller 501, which is powered by its own 3.3 VDC LDO regulator. Additionally, a back up battery 301 is provided that maintains full operation of the system for 10 minutes in case the primary power to the unit is interrupted.

The microcontroller 501 not only controls the individual power supplies, but also monitors/controls GPIO 610 external to the unit. It monitors current to the cameras and fans, while also enabling/disabling them as required.

Pre-Event Buffer Operation

The Pre-Event Buffer is used only in non-event mode (Video only): in this case, two recording for the same video source (one camera per DSP) are performed, one in low-resolution (saved to High-Capacity Storage (HCS 730)), and the other in high-resolution mode (saved into the pre-event buffer). Note that the pre-event buffer is using the HCS 730 only, and not the memory. There is one HCS file for all video frames between 2 I-Frames, e.g. if the pre-event buffer is configured to hold 30 seconds, and there is one I-frame each 30 frames (30 fps recording), there will be 30 files for each camera input using a pre-event buffer. This method allows an easy file roll-over.

HCS Cache Operation

An HCS 730 buffering scheme has been implemented in order to minimize the access to the HCS 730 and improve performance. A DSP delivers the Audio/Video (A/V) compressed frames to the core_app 800 program, which queues the frames into a FIFO (Shared Memory Queue). The av_wd-isk 811 process reads the frames from the Shared Memory Queue and writes them to the HCS 730.

Instead of writing frames directly to the HCS 730, the frames are saved in memory, at a location where a dedicated software component can retrieve them at a later time and then save them to the HCS 730. This process optimizes the disk access time and minimizes the time the HCS 730 is in use, saving electrical and processing power. The HCS cache is implemented as a C++ class, which accepts several parameters to determine operational limits and timing for the process. These parameters include the amount of total memory allocated for the cache, and the percentage of cache used before the data must be stored to the HCS 730.

The HCS cache maintains statistic information that the main application can query and use for information, debugging and tuning purposes such as the maximum cache space utilization, average cache space utilization, minimum, maximum, and average cache flush time, and the average disk writing time (MB/sec).

OSD Operation

An On-Screen Display (OSD) is provided via a hardware OSD chip placed in line between the video inputs and the hardware video decoders.

The OSD inserts text into the video prior to compression. The text includes date, time, and camera name up to 12 characters. OSD information is provided on a per camera basis.

The OSD hardware chip may also be placed directly within any one of the DSP's (210-214), in order to minimize the number of chips required in the system.

Wireless Modem

The embedded wireless modem is 802.11 g. It is used for video and data transfer to the external system server (TVMS) during docking. The wireless modem is also used for local streaming. In this case a computer with 802.11 g capability in close proximity to the MDVR 100 can view real time video from any camera 250 within the system.

Primarily the wireless modem used is from DPAC, which has an Ethernet interface. Additionally, an 802.11 g PCMCIA card may be used.

Streaming Operation

Live and stored streaming both use the Session Description Protocol (SDP) to describe a streaming session and all media to be viewed within that session. Streaming descriptions include elements from the core SDP standard, RTP/AVP standard, MPEG4 elementary stream standards, and custom attributes defined by the streaming server. A custom library handles SDP generation and parsing. Streaming descriptions are retrieved via HTTP. The client will request the streaming description either 1) when the user initiates playback of one or more video streams, or 2) when the MDVR discovery process determines that live streaming should be started.

Live streaming uses a custom RTSP-like command set over HTTP to setup, play, pause and teardown the streaming session. Video and audio elementary stream data are transported using standard RTP packets; the MDVR 100 pushes the packets to the client(s) as live content become available.

The stored streaming process uses HTTP to transport video, audio, and data frames to an output device. The client pulls frames as needed from the MDVR 100 using custom URL queries and HTTP headers.

Streaming Server

The streaming description and control interfaces use the same HTTP server framework as device manager, allowing the streaming server to leverage the same encryption and authentication mechanisms as well. This takes advantage of database and file system access routines from the device manager in order to generate session descriptions and send back stored frame data. The streaming server implements custom handlers within the HTTP server framework for each of the required control and data requests.

File Transfer Operation

For retrieval of video and audio frames and per-frame information, docking relies on the streaming server and uses the same HTTP requests as the streaming client in order to transfer all or part of an elementary stream.

Driver Display Operation

An interface to a driver video display is provided 655. This interface contains power, video, RS-485 communications and contact closure interfaces. A button on the driver display will allow live video viewing to be switched between any of the connected cameras. Depending on the display control interface, this can be accomplished either through the RS-485 communications link or through pulling one of the contact closure lines low.

Audio Processing

Input audio processing is handled through a stereo codec 410. This allows up to two channels of audio input to the system. Each audio input can handle either line or microphone levels. The input level selected will be determined by the audio input on the appropriate pin on the connector. Digital audio will be passed from the codec to a DSP for MPEG4 (AAC-LC) compression.

Output audio process is also handled by the same codec 410 as the audio input. In this case, the stereo audio is summed to produce a mono audio output at line level. Audio output contains information from a streaming input from a device external to the unit. The audio output does not present live or pre-recorded audio from the MDVR 100 unit itself.

Video Processing (Recording)

When the TransitCam application 821 is running (which is normally the case after the MDVR 100 has booted), the MDVR 100 is always recording in either non-event (normal) or event mode.

Each camera is configurable for recording in low-quality, medium-quality, or high-quality video record mode. The recording modes are configured using parameters such as the frame rate per second (1 to 30), the bit rate (bits per second), and the image resolution (D1, Half-D1, VGA, SIF, etc.). In addition, each camera responds to advanced settings such as the rate control (Variable Bit Rate or Constant Bit Rate), the profile (ASP, SP, or H263), the Scene Quality (low, medium, or high), and the number of I-frames per second.

Two cameras are connected to a DSP (up to 8 cameras 200, and 4 DSPs 210-213 are used for video recording). As mpeg-4 encoding is very CPU intensive, it is possible to encode only one of the two cameras connected to the same DSP in the highest-resolution. A video splitter is implemented to allow compression of two separate qualities for one of the cameras connected to a DSP.

Normal Mode

In this mode the high quality recording for a first camera is stored into the Pre-Event Buffer, on the hard-drive, which can hold a configurable number of seconds of A/V frames. This buffer will begin to be overwritten when the data stored in the buffer exceeds the pre-determined size.

Simultaneously, the video frames from a first camera are compressed in the Low (or medium) quality and 'permanently' stored to the HCS 730. The video output from a second camera is also compressed in low (or medium) quality and stored onto the HCS 730.

Event Mode

Upon detection of a pre-configured event trigger, the 'overwriting' of the pre-event buffer will stop and high quality recording for the first camera is appended and stored 'permanently' on the hard-drive. The 1 low (or medium) quality recording for the second camera continues to be stored onto the HCS 730.

The MDVR 100 continues to operate in the current mode until the event trigger is reset and the post-event timer has expired, at which time the MDVR 100 reverts to Normal Mode.

Communication Ports Operation

Ethernet

Three Ethernet ports (641-643) are provided for connection to external devices. Two of the ports (642-643) are located on the rear of the unit. They will operate at 10/100 speed. These ports may be used for an external radio modem, mobile communications router, or for interface to a vehicle logic unit/mobile data terminal.

One Ethernet interface is provided on the front of the unit 641. It will be capable of operating at 10/100 speed and up to Gigabit Speed (Gigabit Ethernet). This port is primarily used for video file retrieval when a wireless method of retrieval is not available or desired.

USB

Three USB 2.0 ports are provided for connection to external devices. Two of the ports 561,562 are located on the rear of the unit. These ports may be used for an external GPS, external radio modem, mobile communications router, or vehicle logic unit/mobile data terminal. Potentially, these ports may also be used for connection to an external mass storage device such as an external high capacity storage server.

One USB 2.0 port 563 is located on the front of the unit. This port may be used as for video file retrieval in lieu of the front panel Ethernet port.

J1708/J1939

The J1708 interface 657 serves as a general-purpose serial data communication interface. The software interface will give the host application the ability to listen to several stand alone modules attached to the serial chain. In a typical J1708 interface, the J1708 protocol serves primarily as the physical and media access functionality. SAE J1587 provides application layer functionality. As defined in the SAE J1708 spec, the software interface will be able to interpret messages matching the 1708 defined format parameters such as the Message Identification Character (MID), data characters, and a checksum.

The software will also have the ability to handle message type defined by both SAE J1708 (MID's 0-127) and application messages defined by SAE J1587 (MID's 128-255).

The J1939 interface is also known as the Car Area Network (CAN). Newer heavy equipment vehicles may use both J1708 and J1939 as a general purpose communications interface between vehicle systems. The J1939 is intended to replace J1708 in the future. The J1939 interface differs from the J1708 in the physical interface as well as the software protocol. The MDVR 100 supports both J1708 (J1587) and J1939.

RS-232

One RS-232 only port 656 is provided on the rear of the unit. The port will be capable of speeds up to 115.2 kbps. The port will not only support data transmit and receive but also two hardware handshaking lines; request to send (RTS) and clear to send (CTS). Additionally the control line, data set ready (DSR) will be provided so that the MDVR can detect that something is connected to the port.

RS-232/RS-485

One port 655 is provided that can support either RS-232 or RS-485. The RS-232 will support only data transmit and receive; there will be no hardware handshaking support. The RS-485 will support a two wire differential connection.

Hardware Overview

Processors

The MDVR 100 unit contains three processors;

The General Purpose Processor (GPP) 101 is a Freescale MPC5200, which contains a Power PC (PPC) core and some integrated peripherals. The GPP 101 manages data between memory (HCS and DDR) and peripherals on the PCI bus (DSP, IDE, USB, etc.), The Digital Signal Processors (DSPs 210-214) are Texas Instruments DM642. The DSPs will be responsible for video and audio compression. They will place the compressed data on the PCI bus, where the GPP 101 directs it to the appropriate device, The Power Supply Processor (PSP) 501 manages the individual power supplies. It will also monitor all GPIO 600 connections to devices external to the unit. The PSP 501 also monitors camera and cooling fan current as well as controlling power to each camera, fan, and heater. The PSP 501 monitors the integrated accelerometer and temperature sensing circuitry.

Peripherals and Interfaces

Accelerometer

The accelerometer will be a single device, monitoring acceleration in all three axes. The accelerometer will be located on the power supply board and monitored by the PSP 501 over the I$^2$C bus 500. The accelerometer will be capable of measuring up to 3 G at 1 mG resolution.

Real-Time Clock

The Real-Time Clock (RTC 502) is responsible for keeping time. It has a battery back up so that time is kept even when power is removed from the system. The RTC 502 can be updated periodically (once a day) via the GPS 610, Network Time Protocol (NTP) during docking, or from time supplied by the vehicle logic unit. At startup, the RTC time information is transferred to the GPP 501 and then used to synchronize all activities of the unit (elementary stream time stamps). The RTC 502 communicates with the PSP 501 over the I²C bus 500.

GPIO

General Purpose Input/Output (GPIO) 610 is monitored/controlled by the PSP 501 over the I²C bus 500.

Twelve inputs 612 are monitored and can be configured as either active high or active low through software control at boot up. The inputs are connected to the system via the external connector block. Each input can handle 0 to 32 VDC. The switching threshold is at 3.3 VDC. Input one is configured for ignition sense, so that the system will boot up whenever the vehicle ignition is on. Inputs eleven and twelve are not only routed to the PSP 501 but also to the GPS module 610. These inputs are used for vehicle forward/reverse sense and speed sense respectively.

Three outputs 614 are provided that are used to drive internal relays. The normally closed, common, and normally open contacts of the relays are routed to the connector block, external to the unit. Each relay is capable of handling 1 ampere of current at 32 VDC.

Both the input and the outputs are monitored even when the system is in the 'off' state, as long as vehicle power is connected to the unit. This facilitates monitoring ignition sense. This feature also facilitates unit activation in a security application by monitoring motion sensors or door contact closures if so configured through software.

GPS

A Global Positioning System (GPS) 610 receiver is provided as a customer option in the system. The GPS employs Dead Reckoning (DR), which improves position accuracy and provides constant position when the satellite signals used for GPS 610 are blocked by tunnels or urban canyons.

The GPS unit 610 is mounted external to the unit and is interfaced to the unit via the DB-15 on the power supply board. The GPS 610 uses two signals from the vehicle; forward/reverse sense and speed pulses (both from the transmission). A gyroscope is used in the GPS unit 610 to detect change of direction. The gyroscope must always be mounted upright; therefore the GPS unit 610 can be mounted either vertically or horizontally depending upon the desired orientation within the mass transit vehicle.

Power for the GPS module 610 comes from the unit power supply 300. Communications with the system is handled over a serial interface to the GPP 501.

Power Supply

Figure 1:
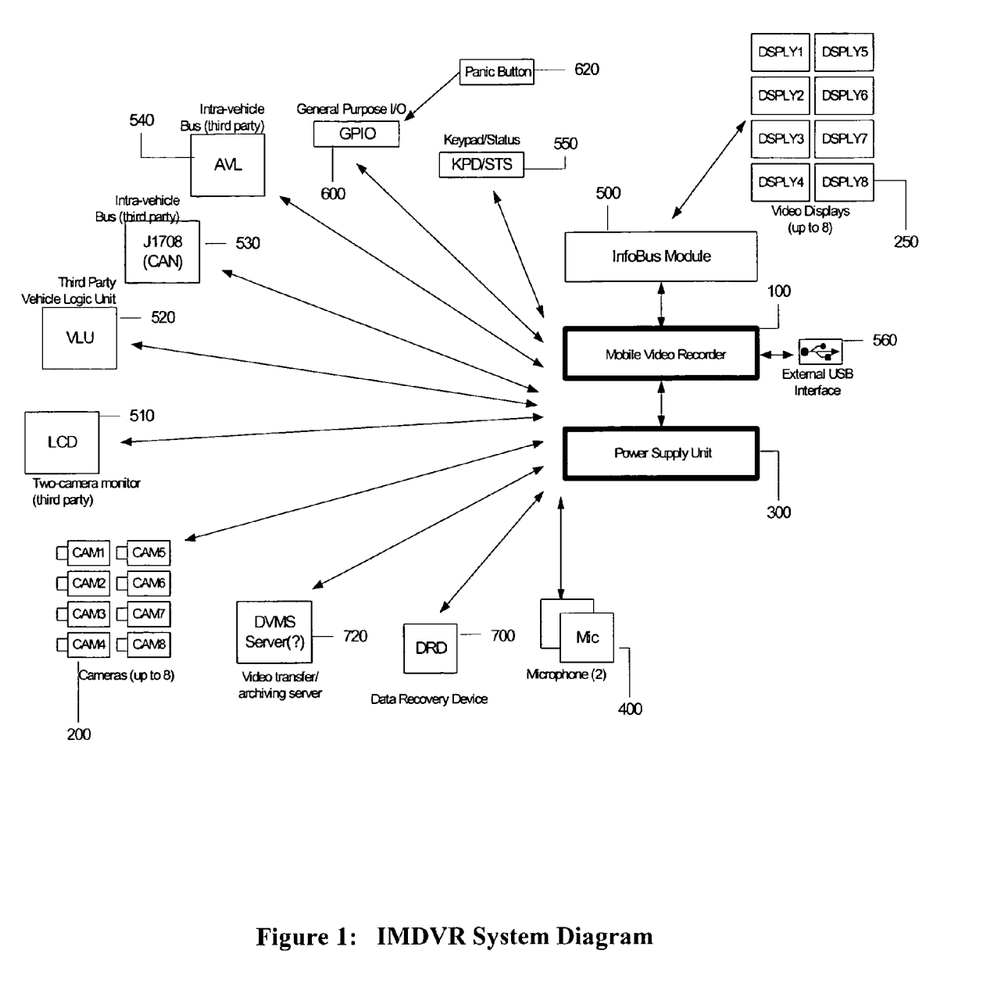
FIG. 1: a view of the system diagram.
Figure 2:
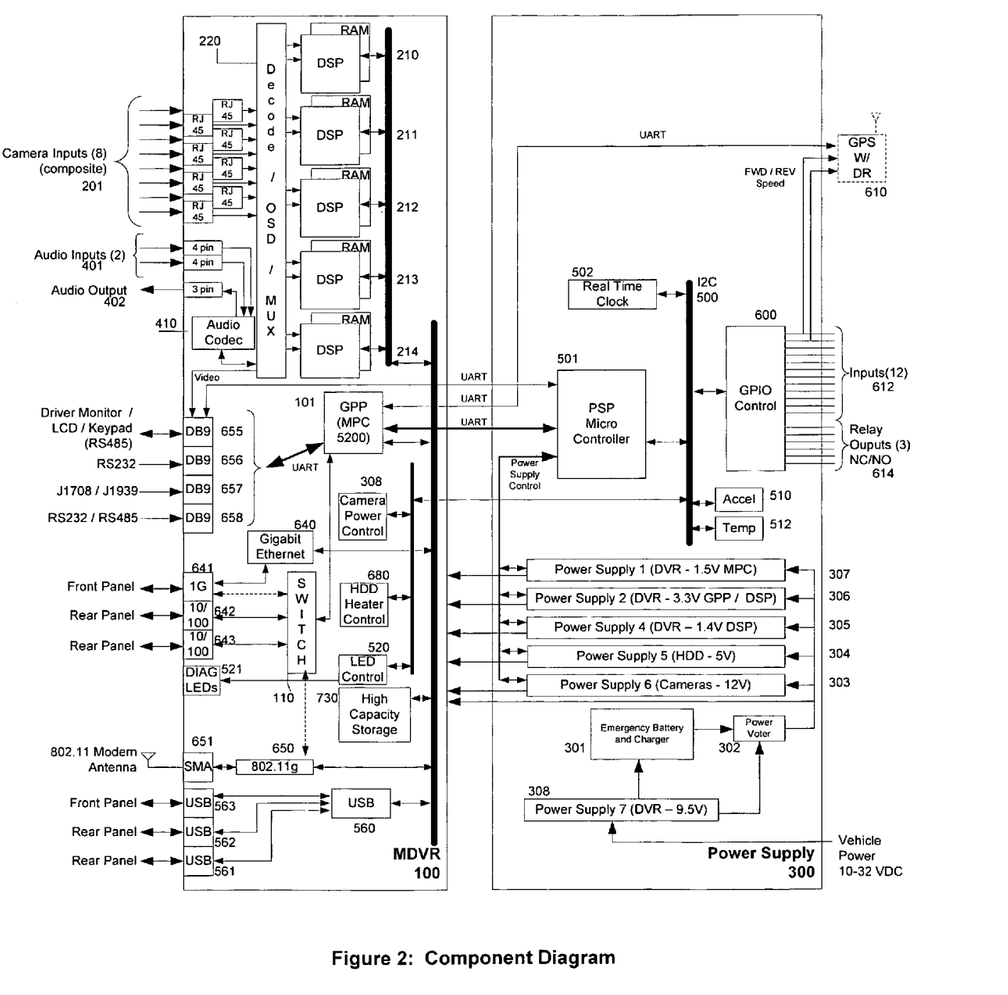
FIG. 2: a view of the component diagram.
Figure 3:
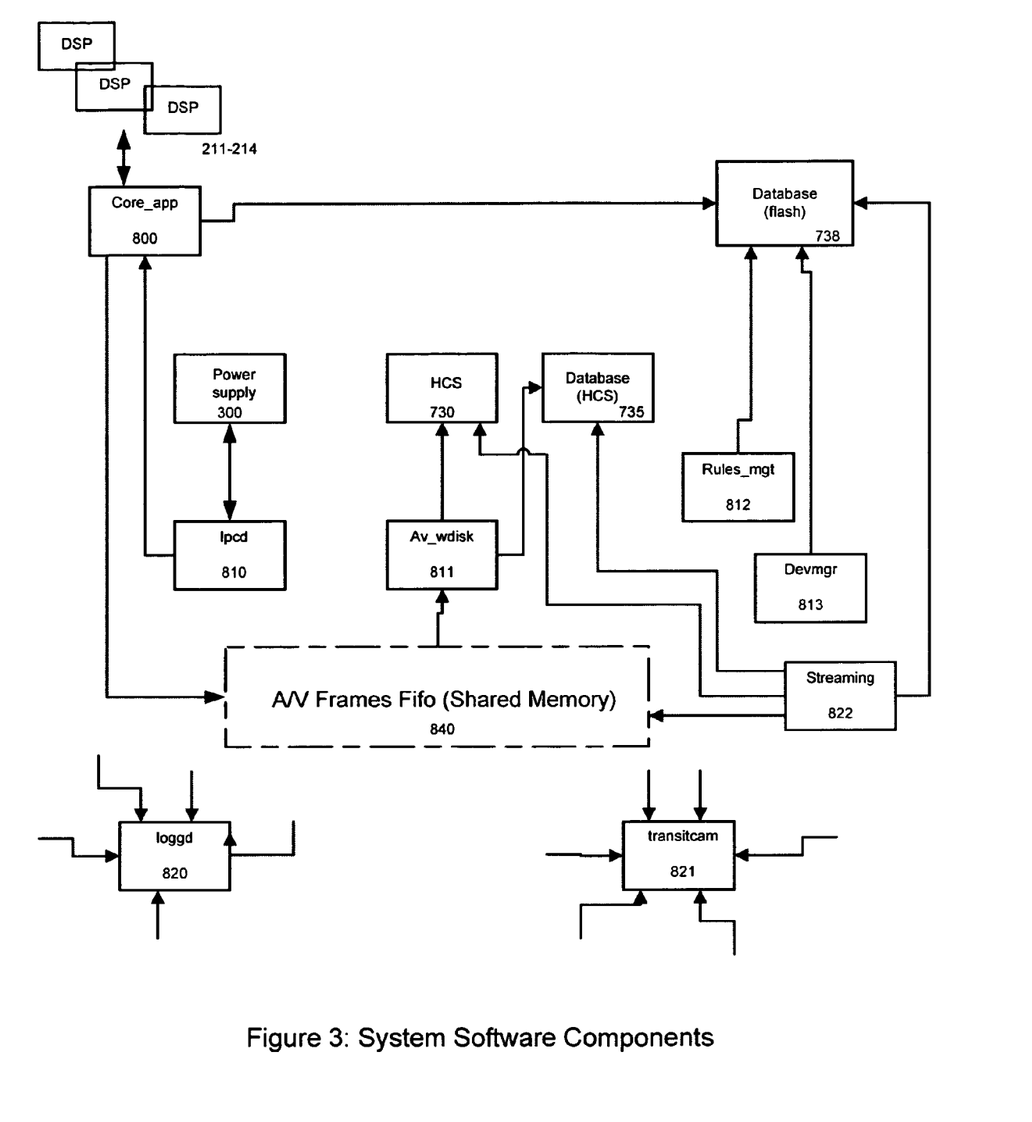
FIG. 3: a view of the software system components.
Figure 4:
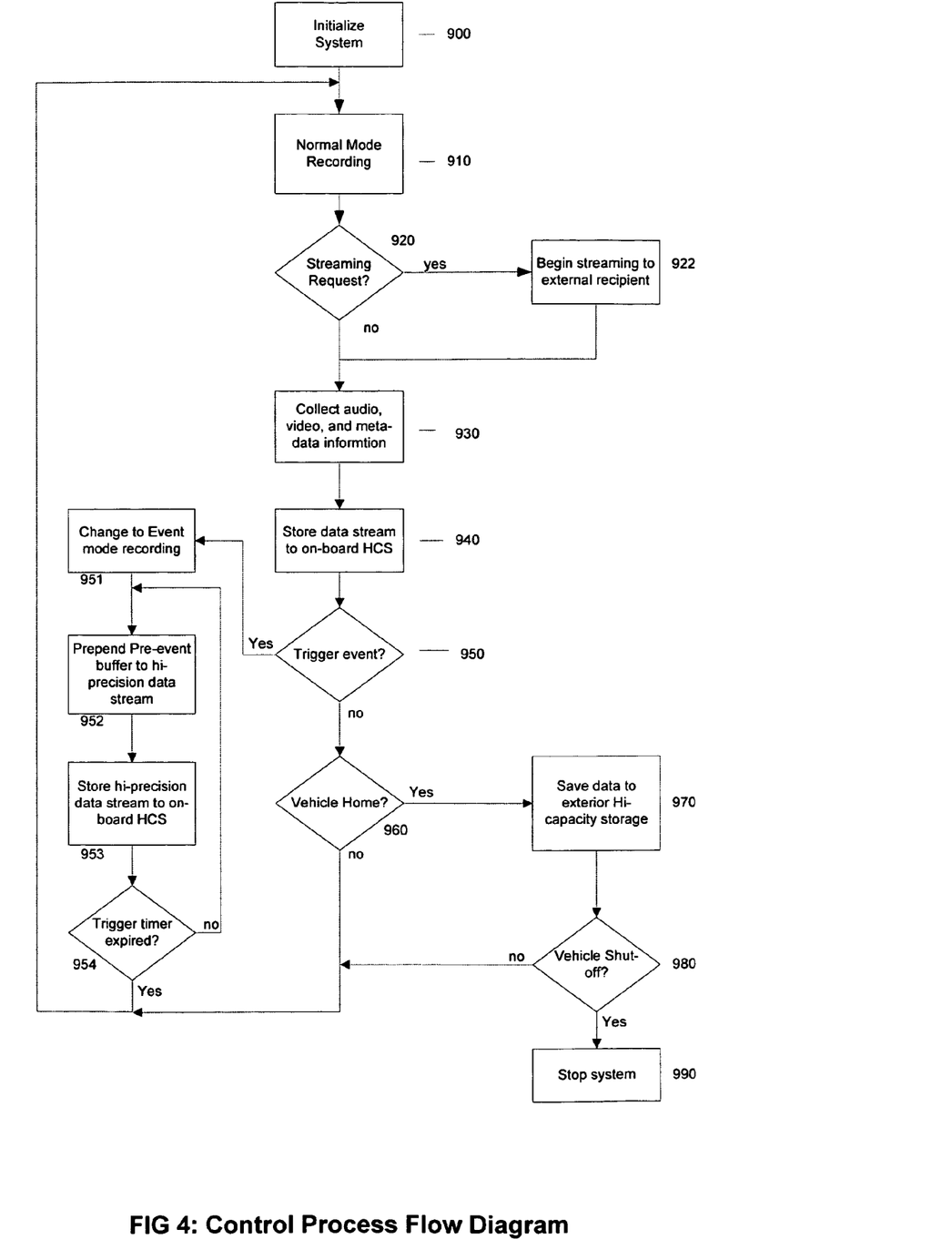
FIG. 4: a view of the process flow diagram

Power is provided to the system from the vehicle power source. The power system includes a separate battery 301, which is used for smoothing the power profile to the IMDVR system (FIG. 1), and emergency charger to insure continuous operation of the recording function. The power supply system 300 also includes a software controlled voting function that decides whether to supply power to the IMDVR 100 from the vehicle source or the battery backup based upon the instant power profile. The power supply system is responsible for adjusting input power to provide voltage levels of 12V 303, 9.5V 308, 5V 304, 3.3V 306, 1.5V 307 and 1.4V 305 as required by the various sub-systems within the IMDVR 100.

MDVR

The Mobile Digital Video Recorder (MDVR) 100 is provided as the central record and storage engine within the system. The MDVR 100 includes a microprocessor for inter-process communication and control of all components connected to a primary information bus 101, which includes all of the following components. The MDVR 100 comprises up to eight cameras 200 strategically mounted in locations to observe interior and exterior scenes of activity in and around the mass transit vehicle. The MDVR 100 also comprises an input for each camera into a video codec 220, a multiplexer for joining video input and transferring to Digital Signal Processors (DSPs 210-214). Each DSP receives input from two cameras. The MDVR 100 includes two audio inputs and an audio codec for integrating audio data into the stored information stream. The MDVR 100 also comprises inputs from exterior data sources including a monitor output, keyboard input 655, input from serial ports supporting third party data sources such as the SAE J1708 and J1939 vehicle area network inputs 657 for recording data and meta-data comprising vehicle performance data, communication connections for external communications such as Ethernet 642-643, Gigabit Ethernet 641, wireless connectivity through a wireless modem antenna 651, Universal Serial Bus (USB) connections to external equipment control panels 561-563, and Diagnostic LEDs. The MDVR 100 comprises connections to on-board high-capacity storage devices 730, and heating 680 and cooling devices to provide for retaining operating temperatures for the storage devices within environmental operational limits. The MDVR 100 is tied together operationally through two high-speed, high-capacity communication buses to provide inter-process communication under GPP 501 control throughout the system.

OSD Module

On-Screen Display (OSD) is accomplished with a hardware OSD chip. OSD is only in-line with the recorded input. The chip is capable of integrating OSD information on eight inputs. A two-way multiplexer is used to switch between real-time video and OSD on a frame by frame basis, recording OSD video information on one-half of the frames. The OSD chip is controlled by the GPP.

Additionally, the OSD hardware can be replaced with a DSP algorithm that will add OSD to every recorded frame.

Wireless Modem

An internal 802.11 wireless modem 650 is provided in the system. This modem is connected to an internal Ethernet port on the GPP 651. This modem is the primary means of transferring recorded video, audio, data, and meta-data. Additionally, this modem can be used for video streaming as long as another 802.11 device is in range. The 802.11 650 can make connections via infrastructure or ad hoc on an as needed basis.

External wireless modems are also supported. These modems communicate over the cellular network. They are primarily used for streaming low resolution (low frame rate) video to a central point. Connection to the wireless cellular modems may be accomplished over USB 563, Ethernet 642, or RS-232 658.

Ethernet Module

Ethernet support is part of the integrated peripherals of the GPP 101. The Ethernet functionality goes through an Ethernet switch 110 that provides four ports. Two ports go to RJ-45 connectors on the rear of the unit 642-643. One port is reserved for an 802.11 internal wireless module 651. The last port is a spare, but routed to the front panel board connector as a backup to the Gigabit Ethernet 641.

Gigabit Ethernet 641 support is provided by an Ethernet chip on the PCI bus. This port is routed to the front panel board connector for connection to the front panel RJ-45 connector.

USB Module

Universal Serial Bus (USB) support is accomplished by a USB 2.0 host controller on the PCI bus. This controller supports three USB ports: two on the rear of the unit 561-562 and one on the front of the unit 563.

High Capacity Storage Device (HCS)

The MDVR 100 supports a plurality of High Capacity Storage Devices 730 including up to four 2.5 inch Hard Disk Drives, or high-capacity flash memory. The HDDs are mounted such that two drives are serviced by one connector on the main board. The HDD are controlled via a HDD IDE controller connected to the PCI bus. The high-capacity flash memory is connected to the PCI bus and controlled by the MPC 5200 through PCI device controls.

Audio Codec

The audio codec 410 processes both input and output audio to/from the system. Setup for the audio codec is accomplished over the I$^2$C bus 500 connected to the servicing DSP 210-214. Audio input and output are stereo line level. Audio inputs at microphone level require filtering and amplification to line level for proper operation. The audio output left and right stereo channels are summed together to provide a monaural output.

Video Multiplexers

There are three 8:1 video multiplexers 225 used in the system. One multiplexer routes analog video to the live video monitor for real time viewing of video from the selected camera. The other two multiplexers route analog video to the two video decoders used for streaming.

Video Decoders

Ten video decoders are used in the system. One of the video decoders (eight total) is associated with each camera. Two additional video decoders are used for streaming. Each of these decoders is connected to the cameras through an 8:1 multiplexer. Two video decoders feed each DSP.

HDD Heaters

HDDs used in the system are capable of operating between −20° C. and 85° C. The low temperature specification for the system is −30° C. At boot-up, heaters 680 are used to raise the temperature of the HDD from below −20° C. to −20° C. at a rate of 1° C. per minute to achieve the proper temperature operation profile. The heaters have an integrated thermistor.

Software Processes

TransitCam Application

The transitcam process 821 starts, stops, and monitors all processes of the TransitCam application. Monitoring the processes consists of polling the system to check if all applications are running. If not, the missing process will be restarted, and the incident will be logged. The transitcam process 821 also monitors how much the CPU is used by the processes, and will adjust the priority of an 'offending' process if it consumes too much of the CPU. For instance, recording the A/V files onto the HCS should run at higher priority than the HTML server (configuration). If after adjusting the priority of the process, it is still using 100% of CPU for a 'long' period of time (more than 20 seconds), the process will be stopped, then restarted.

Shared Memory

Shared memory 840 is a first in, first out (FIFO) queue. This queue provides temporary storage of A/V frame for distribution to other applications. The size of this queue is approximately 4 MB, which will allow enough time for the programs reading this FIFO to handle the frames (saving to the HCS, streaming, etc.).

Logger Daemon

The application logger daemon (loggd) 820 logs events sent by the application processes. The communication between the loggd process 820 and all other application processes is done through shared memory 840.

Depending of the type of the log (system or application), the log will be saved either into a daily text file (system level log), or into a database (application level log):

IPC Daemon

IPC Daemon 810 handles the communication between the GPP 101 and the PSP 501. It runs as a separate process on the GPP 101, and is loaded at a very early stage during system initialization so that some primitive diagnostics are performed on the PSP 501 even before the main application starts.

Core Application

The core application (core_app) 800 is the main application process. It is primarily responsible for controlling and handling the recording of the A/V streams and provides the A/V compressed frames to the other processes that need them. This application is the only process that interfaces with the DSP 210-214 (configure and control). The core application 800 also handles the alarms. The core application 800 is responsible for changing the format of the A/V files, which are recorded according to the state of the system (event mode or non-event mode).

The core application 800 stores the compressed A/V frames into Shared Memory, which enables one writer process (core_app program 800) and several reader processes (streaming, av_wdisk 811).

Rules Management Process

The rules management process (rules_mgt 812) receives input data from various sources (I/O, etc.) and applies a set a configurable rules to determine the status of the system (mainly alarm or non-alarm mode). This information is then be forwarded to the other processes. The rules management process also initiates the generation and collection of metadata that is incorporated into the integrated data stream and stored in the HCS.

A/V Recording Process

The A/V files recording process (av_wdisk 811) is responsible for writing the integrated data stream onto the hard-disk. It gets the frames from the core application via shared memory.

In event mode, this process writes the A/V frames onto the HCS 730 from the pre-event buffer.

If the HCS 730 is not available, this process will allow the MDVR 100 to continue recording, but will not save the integrated data stream files until the hard-drive will become available. When the HCS 730 becomes available again, this process will allow the MDVR 100 to start writing the integrated data stream files onto the HCS 730.

Streaming Server

The streaming server (streaming 822) is responsible to stream out the A/V streams to the streaming client. It gets the A/V frames from the core application via shared memory.

Device Manager

The Device Manager (devmgr 813) is responsible for the Server to MDVR 100 interaction. It also handles the system configuration through the HTML interface.

Time Zone

All events time stamped within the MDVR 100 (A/V frames, log events, etc.) are using UTC time, and not local time. An environment variable is used by the System to change the way the time is locally interpreted.

GPS

The GPS interface 610 communicates with the TransitCam platform via NMEA defined messages. In several different NMEA messages, UTC time is available. These messages include the following:

BWC—Bearing and Distance to Waypoint
GGA—Global Positioning System Fix Data
GGL—Geographic Position, Latitude and Longitude
RMC—Recommended minimum specific GPS/Transit data From the UTC time fix in any of these messages, and the time zone setting of the system, time sync can be achieved.

RTC

The Real Time Clock (RTC) 502 is a battery-backed clock that is external to the PSP 501, communication between the two occurs via I²C 500. Upon boot up of the MDVR system 100, the PSP 501 receives the current value of the RTC 502. The PSP 501 passes the time information to the GPP 101. RTC 502 data is supplied to the GPP 101 on a periodic basis and when requested. The RTC 502 is calibrated with the GPS 610 or with network connection during configuration/upload. The RTC 502 data is very accurate and has a difference of +1 second.

MDVR Discovery

The MDVR 101 and other system level devices that intend to discover it use Zero Configuration Protocols (Zeroconf) to support addressing, naming and service discovery. When an MDVR 101 joins a network or its discovery information (including status) changes, it will push the updated information to all listening clients, who can choose to take further action depending on the information received. A new client who joins the network can query the network for all attached MDVRs 101 and receive their discovery information back immediately.

Link Local IP Addressing (IPv4LL)

In the absence of a DHCP server or static address configuration, an MDVR 101 assigns itself a random IPv4 address in the 169.254/16 subnet. It is then able to communicate with existing operating systems (including Windows) that already implement this feature, allowing ad hoc local networks to be formed effortlessly.

Multicast DNS

Multicast DNS (mDNS) provides a mechanism for naming and service discovery on a local link where a DNS server may not be present. DNS queries and responses are instead sent to a locally-scoped multicast address (224.0.0.251, port 5353). It can be used whether an MDVR is configured with any of a link local, dynamic or static IP address. Every MDVR assigns itself a unique name in the .local domain based on its serial number. Each advertises its own A and PTR DNS records for forward and reverse lookups, respectively, as well as service discovery records described below.

DNS Service Discovery

Each MDVR 101 registers PTR records for service types it offers (such as _mdvr._tcp) and SRV records (such as MdvrId._mdvr._tcp) giving the address and port of the service. TXT records provide additional parameters for each service, such as the URL path to access the service or status flags so a client can determine if the MDVR needs attention.

Inputs/Rules/Events

Input Definition

Inputs are values read from peripherals, including among other things the data from GPS 610, the messages received from the J1708/J1939 bus 657, and the values read from the GPIO lines 612.

Each of the GPIO lines can be configured to have different meaning (e.g., ignition sense, door open . . . etc.)

Rule Definition

A rule is an input plus an operator plus a value. Some examples may be "Door open ==true", "Speed>=65".

Event Definition

An event is one or more rules logically ANDed together, and can be associated with zero or more actions. When all of the rules are satisfied for an event, the event is said to be "triggered". When an event is triggered, a log entry corresponding to that particular event will be logged. In addition, the actions (if any) associated with the event will be carried out. Some event examples may be "(Panic button pressed ==true)=>Start high-res recording (on pre-configured cameras)", "(Door open ==true) AND (Speed>=10)=>Notify the control center".

High-Quality Recording

One possible action for a triggering event is to start recording in high-quality mode. If this action is enabled, when the specific event triggers, the pre-configured cameras will switch to high-quality recording mode. A timeout period will be associated with each event (if high-quality recording is enabled) to resume normal recording mode after the timer has expired.

In the case of overlapping triggers (i.e., multiple triggering events whose actions result in the same camera going into high-quality recording mode), the normal recording mode will not resume until the last timer of the group of triggering events has expired.

Trigger Notification

Another possible action for a triggering event is to notify the control center. If this action is enabled when the specific event triggers a notification will be sent through an internal communication mechanism to a predefined host.

Rule Engine

The Rules Engine 812 is a separate program that uses the Input Definition and Rules Definition to generate the Triggers, according to the Triggers Definition. Each time a new I/O event is received, the rules are then checked to determine if there is a need to generate a trigger.

The Rules Engine program 812 is a high-priority process, designed with optimizations and performance in mind. For instance, for performance reasons, the Rules Engine 812 is using a local copy in memory of the Database tables involved.

The Rules Engine program 812 receives input information from the ipcd 810 program, applies rules to computer the Triggers state, and sends the Trigger state to a pre-defined set of programs within the system. The pre-defined programs are the main program (core_app 800), the streaming program (streaming 822), and the Device Manager (devmgr 813).

Audio/Video Analytics

The collection and storage of audio, video, and meta-data provides opportunities for the IMDVR to provide a number of functions as a result of analyzing the stored data stream in conjunction with the rules engine to search for specific activities and provide indicators when such activities have occurred. Activities that can be recognized and reported upon include:

- Automatic License Plate Recognition
- Recognizing a Man Down
- Weapons Brandishing/Violent Motion
- Gun Shot Detection
- Multi-Camera Rendering
- People Counting
- Slip and Fall
- Motion/Pattern Recognition and Tracking
- Unique face Extraction
- Motion Stabilization/Frame Averaging
- Noise Cancellation Recording Normal Mode In this mode the High Quality recording for the Camera 1 is stored into the Pre-Event Buffer (on the pre-event section of the HCS), which can hold a configurable number of seconds of integrated data stream frames. Only the Low Quality recording for a first camera and a second camera stored onto the Hard-Drive.

Event Mode

In this mode the High Quality recording for camera one is stored on the hard-drive, along with the Low Quality recording for camera 2. The Low Quality recording for the first camera is thrown away.

Pre-Event Buffer

The Pre-Event Buffer is used only in non-event mode (Video only): in this case, two recordings for the same video source (one camera per DSP) are performed: one in low-quality (saved to the HCS), and the other in high-quality (saved into the pre-event buffer). Note that the pre-event buffer is using the HCS only, and not the memory. There is one HCS file for all video frames between 2 I-Frames, e.g. if the pre-event buffer is configured to hold 30 seconds, the record speed is set to 30 frames per second, and there is one I-frame each 30 frames, there will be 30 files for each camera input using a pre-event buffer. This method allows an easy file roll-over.

When an event occurs, which triggers Hi-Quality recording, the video output from the Hi-Quality camera is now saved to the HCS 730 and the pre-event buffer is prepended to the camera output to provide a configurable (from 1 to 180) number of seconds of Hi-Quality data recorded prior to the trigger event HCS Buffering In order to minimize the access to the HCS 730 and improve performance, a Hard-Drive buffering scheme is implemented. The following is the flow of the A/V frames, from a DSP to the HCS 730:

- The DSP delivers the A/V compressed frames to the core_app 800 program
- The A/V frames are queued into a FIFO (Shared Memory Queue 840)
- The process av_wdisk 811 reads the frames from the FIFO (Shared memory Queue 840) and writes them to the HCS 730.

A/V Files Format

The A/V files are split into two files:
- The Elementary Stream (ES), which is Audio or Video
- The Frame Information.
- The ES file is a MPEG-4 Video or Audio file.
- The Frame Information file is a binary file, with a proprietary format, that provides:
  - Frame Type (I-frame,P-frame, B-frame): one byte
  - Offset into the ES file: 4 bytes The A/V files are stored into a sub-directory. The group of files (A/V ES files, A/V frame information files) is called batch files. To keep files with a reasonable size, a new batch file is created each 15 minutes (this is a system value configurable in the database). A new batch file is also created when the system switch from non-event mode to event mode, or from event mode to non-event mode, whether the trigger is configured or not to generate Hi-quality recording.

The integrated data stream files are stored in an off-vehicle storage system and follow the long term retention and review policies of each client.

Data Retrieval

Streaming

Live and stored streaming both use the Session Description Protocol (SDP) to describe a streaming session and all media to be viewed within that session. Streaming descriptions include elements from the core SDP standard, RTP/AVP standard, MPEG4 elementary stream standards, and custom attributes defined by the streaming server. A custom library handles SDP generation and parsing. Streaming descriptions are retrieved via HTTP. The client will request the streaming description either 1) when the user initiates playback of one or more video streams, or 2) when the MDVR discovery process determines that live streaming should be started.

Live streaming uses a custom RTSP-like command set over HTTP to setup, play, pause and teardown the streaming session. Video and audio elementary stream data are transported using standard RTP packets and the MDVR 100 pushes the packets to the client(s) as live content becomes available.

Stored streaming uses HTTP to transport video and audio frames. The client pulls frames as needed from the MDVR 100 using custom URL queries and HTTP headers.

Streaming Server

The streaming description and control interfaces use the same HTTP server framework as device manager, allowing the streaming server to leverage the same encryption and authentication mechanisms as well. It takes advantage of database and file system access routines from device manager in order to generate session descriptions and send back stored frame data. The streaming server implements custom handlers within the HTTP server framework for each of the required control and data requests. The live streaming transport 822 runs as a separate task that receives recently encoded video and audio frames from the DSP task. Based on the status of client connections, this task packages relevant frame data into RTP packets and sends those packets out to waiting clients. A custom library handles packaging and sending RTP packets.

Docking

The HCS 730 located within the mass transit vehicle will require downloading when it is full. One method for retrieving the integrated data stream files from the HCS 730 and freeing the storage on the HCS 730 for further use is known as 'docking'. Docking the HCS 730 is to physically remove the HCS 730 from its cradle within the mass transit vehicle and place the HCS into a similar cradle attached to an off-vehicle storage server. The server then retrieves all of the stored data from the HCS by downloading it into the off-vehicle storage.

For retrieval of video and audio frames and per-frame information to an off-vehicle storage server, docking relies on the streaming server and uses the same HTTP requests as the streaming client in order to transfer all or part of an elementary stream.

J1708/J1939

The J1708/J1939 serves as a general-purpose serial data communication interface for vehicle telemetry. The software interface will give the host application the ability to listen to several stand alone modules attached to the serial chain. In a typical J1708 interface, the J1708 protocol serves primarily as the physical and media access functionality. SAE J1587 provides application layer functionality. As defined in the SAE J1708 spec, the software interface will be able to interpret messages matching the 1708 defined format listed below:

J1708 Message
  Message Identification Character (MID)
  Data Characters
  Checksum
  The software will also have the ability to handle message type defined by both SAE J1708 (MID's 0-127) and application messages defined by SAE J1587 (MID's 128-255).

AVL

AVL stands for Automatic Vehicle Location which is a term used for naming a system able to track vehicles, vessels, and mobile assets such as trailers, containers, and equipment, plot their coordinates into one or more computer generated maps and be able to interact with them in several ways. The TransitCam platform will have an AVL interface available to it as a customer option. The AVL interface will attach to the TransitCam via one of the available interfaces; Ethernet, J1708, USB, RS-232 or RS 485.

Log/Audit/Alert

There are three kinds of log information:
  System log:
    The System Log collects log information from the kernel and various system applications and is useful to troubleshoot any system related issue. This log file is stored onto the hard-drive in a text file format. As many as the last seven days of system log are saved based upon the desired level of data to be saved, which is configurable by the user from one to seven days.
  Application Debug Log:
    This log collects logging information from the TransitCAM application 821 and only intended for the development team to troubleshoot any issue. This log file is saved with the System log file.
  Application Log
    The Application Log collects log information from the TransitCAM application 821. This log file is stored on the HCS 730, in a SQLite database format. Different types of information are logged:
      Error and unexpected events
      Events triggering an alarm
      All Operations such as:
        Configurations Changes
        Playback (streaming) Audit
        Docking Audit
        A/V files export
If the HCS 730 is not available, no logging information is then saved, until the HCS 730 becomes available. But 128 K of memory is used to buffer (FIFO) the log messages and this buffer will be flushed to the HCS 730 when it becomes available.

Diagnostics

The diagnostics utility has a broad overall description and purpose. In the very basic sense, one could run diagnostics to simply give information on the current state of some piece of architecture. In this case, however, the diagnostics package is expanded to include utilities for manufacturing tests, in-service tests and initial power-on tests.

The diagnostics description is divided into two major sections. The first describes differences between different levels of diagnostics, and their implications and dependencies to the system. The second lists the various targets of the diagnostics utility.

Test Levels

Manufacturing Diagnostics

Manufacturing tests are by far the most destructive tests to a usable environment. This is not to say that a device will be left completely unusable. Instead, it should be specifically noted that the end user should not expect a system to keep any personalization if this level of tests are performed. The manufacturing tests should restore a usable system to a default state. This includes initial HCS 730 configuration and initial image loading into flash.

Local/Off-Line Diagnostics

This level has the opportunity to be destructive, as the test implies that a unit has been returned by an end customer because of some sort of problem. In that sense, the end user cannot be guaranteed that user specifications will be saved. Therefore, these tests may not be as destructive as Manufacturing tests, but there is no guarantee that there will not be significant changes.

Remote/Off-Line Diagnostics

For any remote tests, it is assumed that the end user personalization will not be changed. However, this test set is in general a superset of remote on-line diagnostics. This means that while user data will not be lost, a user would have a more-complete test if they return their system to a very basic state. For example, if a user needs to run HCS tests, then it is recommended the user remove any saved data streams. This will allow for more areas of the disk to be tested, extending the test coverage.

Remote/On-Line Diagnostics

This level is a set of tests that are kept very short, in order to look for basic system state while the device is in use. This level, along with POST, is run in the background to look for errors in the system. These tests are not destructive, and the user should not be concerned with configuring their device in any specific way.

Power-On Self Test

In general, the Power-On Self Test (POST) is written to be a very short and basic test of the system each time the system is initialized. The end user will most likely always prefer a system that starts as fast as possible to avoid needless delays.

Power On Self Test (POST)

The main idea behind POST is to provide a working system to the main operating system. This is analogous to the BIOS test in a PC. Each step in the POST has a different path to take based on the result of the test. The details for each test are given in this section.

Configuration

POST must be configurable with three test options are available: No-Test, Quick-Test and Full-Test. The No-Test option tests ONLY the communication between the PSP 501 and GPP 101, as this must be verified on each power-on to ensure the very basic communication path between the two boards. The Quick-Test performs a limited test of each of the applicable components of the boards. The Full-Test is a superset of the Quick-Test, in that some components will be tested exactly the same for both tests, but will also include a higher grade of test for other components.

Each of the test images has responsibilities to complete certain portions of POST. This is due to the requirements of each image.

FPGA Unit

The Field Programmable Gate Array (FPGA) unit is used within the system to provide maintenance and elemental level of control for devices within the TransitCAM system. The FPGA is connected to the primary data bus and interfaces with the primary processor to issue commands for device control, such as switching views between cameras, synchronization of timing for integration of audio, video, and data streams, and providing ad hoc maintenance access for technical and maintenance crews. This unit is field programmable and field upgradable and may be used to monitor and modify primary level commands within the TransitCAM system.

Interface with Device Manager/Core Application

The diagnostics application is responsible for running tests, logging results and updating the database with those results.

The Device Manager (DM) will write to the database and instruct the Core Application to rescan the database to start a specific diagnostic. The DM will monitor the database for status and results (as given by the diagnostics application).

The Core Application 800 sends a command to the diagnostics application to start a specific test.

It is assumed that when a user wishes to run a diagnostic, the DM disables critical operations that could possibly invalidate a diagnostic, or which a diagnostic could corrupt data that would otherwise be considered valid.

Flash Database

As a means of communicating between the diagnostics utility and the DM, a common flash interface is used. The DM tells the core application to rescan a certain section of the database when specific operations are desired. As an extension, when a user wishes to run a specific diagnostic, they select an operation in the DM, which then changes a database value. The core application 800 then reads the database, and sends a command to the diagnostics daemon. This daemon is then responsible for either running the test, or sending a message to the PSP 501.

External Control Description

A single external control is required. This control should be a push button located on the front panel. The push button will be used to notify the system that a device plugged into the front panel USB port is about to be removed. The system will gracefully close any connection to the front panel USB port.

External Indicator Description

Four external bi-color LEDs will be provided on the front panel. These LEDs are capable of displaying three colors: Red, Green, and Yellow (Red+Green). The following sections describe the meaning and indication of each LED.

LED#1, Self-Tests

The first LED will be labeled 'Power'. It will be used to indicate the progress of the system during boot up and to indicate any power on self test (POST) failures.

LED#2, MDVR Hardware

The second LED will be labeled 'Status'. It will be used to indicate the system status once the system if fully booted.

LED#3, Wi-Fi Network

The third LED will be labeled with a small antenna with three arcs emanating to the right of it. It will be used to indicate the status of the wireless network connection.

LED#4, Front USB Port

The fourth LED will be labeled with be the universal USB symbol. It will be used to indicate the status of the front panel USB connection.

While this invention has been particularly shown and described with reference to preferred embodiments thereof, it will be understood by those skilled in the art that various changes in form and details may be made therein without departing from the spirit and scope of the invention as defined by the appended claims.

We claim:

1. A mobile, ruggedized, high-resolution, high-capacity, multicamera digital video and audio recording and storage system comprising:

a high-resolution digital video recorder ruggedized for installation within a mobile, mass transit vehicle;

a plurality of high-resolution cameras installed on and within said mass transit vehicle and separably connected to said digital video recorder through wired means, said cameras aimable to capture video information data within said mass transit vehicle and video information data of exterior views in proximity of said mass transit vehicle;

a high-resolution display for displaying imagery of views composed from video information data within and of the exterior proximity of said mass transit vehicle, wherein said imagery is provided as input to said displays from said digital video recorder;

a plurality of high quality microphones connected to said digital video recorder and capturing audio data, wherein said audio data is converted to digital format and synchronized with said imagery data;

means for integrating captured audio, video and meta-data information into one data stream;

at least one high-capacity storage device for storage of all captured video, audio and input data and including meta-data wherein said meta-data comprises at least analytic and telemetry data;

an information bus electrically interconnecting each of the components of the system one with another wherein interprocess communication and data transfer to and from each component of the system occurs through the electrical connections maintained by said information bus;

a power supply module electrically connected to the power supply system of said mass transit vehicle and containing a separate battery wherein said power supply module is configured to transform vehicle power into a plurality of power levels and said battery is configured to maintain a smooth power profile necessary for proper operation of said mobile digital video system;

a general purpose input and output interface and control module;

user controls and a user interface display;
means for processing video image data and video information data for storage and transmission over wired or wireless communication channels;
a plurality of interface connection access points for a plurality of separably attachable external and internal standardized components and information bus connections, wherein said standardized components and information bus connections are supplied by third-party vendors;
a microprocessor-based server comprising software modules for at least the archiving of said audio, video, data and meta-data to a storage device within or outside of said mass transit vehicle and controlling the transfer of said data over wired or wireless communications channels;
said microprocessor-based server also comprising a software module for executing rules from a rules engine wherein said rules comprise rules for monitoring system operational parameters, performing system administration tasks, and providing system alert settings and alert indicators;
and said microprocessor-based server comprising at least a software module for processing audio and video data as said data is collected in real-time, a software module configured to transfer said data within or exterior to said mass transit vehicle, and a software module configured to stream said collected data in real-time to a display located within or exterior to said mass transit vehicle.

2. The digital video and audio recording and storage system according to claim 1, wherein the system is ruggedized to meet the environmental requirements recited in the Society of Automotive Engineers (SAE) standard J1455 or equivalent.

3. The digital video and audio recording and storage system according to claim 1, further comprising at least two, and as many as eight, RJ45 camera input connections.

4. The digital video and audio recording and storage system according to claim 1, further comprising at least two, and as many as eight, high-resolution cameras.

5. The digital video and audio recording and storage system according to claim 1, further comprising at least one 8:1 video multiplexer.

6. The digital video and audio recording and storage system according to claim 5, further comprising a first video multiplexer to route analog video data to an operating analog video monitor display, and at least two additional video multiplexers to route analog video data to a plurality of video decoders.

7. The digital video and audio recording and storage system according to claim 6, further comprising a plurality of video decoders wherein each video decoder receives video input from one of said video multiplexers and each of the video decoders is associated with either a camera or a streaming video data output channel.

8. The digital video and audio recording and storage system according to claim 7, wherein said means for processing video image data and video information data further comprises a plurality of Digital Signal Processors (DSPs) wherein each DSP receives the video image data and video information data output from two video decoders.

9. The digital video and audio recording and storage system according to claim 1, further comprising an audio codec with a plurality of input connections for said microphones and a plurality of audio output connections wherein said output connections include at least an external audio channel and an audio data connection to any one of a plurality of DSPs through any of said video multiplexers.

10. The digital video and audio recording and storage system according to claim 9, further comprising synchronizing said audio data with said video data.

11. The digital video and audio recording and storage system according to claim 1, further comprising a high-capacity storage device wherein the storage device is at least one of a hard disk drive or high-capacity flash memory.

12. The digital video and audio recording and storage system according to claim 11, further comprising means for integrating audio, video, data and meta-data information into a single integrated data construct wherein said construct is stored in said high-capacity storage device.

13. The digital video and audio recording and storage system according to claim 1, further comprising power supply output levels of at least 1.4V, 1.5V, 3.3V, 5V, 9.5V and 12V.

14. The digital video and audio recording and storage system according to claim 1, further comprising system connections for externally provided devices that comprise any of a keypad, a wireless modem, an analog monitor, or an LCD display.

15. The digital video and audio recording and storage system according to claim 1, further comprising a plurality of interface connection access points that comprise any of Universal Serial Bus (USB) connectors, SMA connectors, 10/100 Ethernet connectors, Giga-bit Ethernet connectors, DB-15 connectors, and DB9 connectors, wherein said connectors provide for electrical connectivity between external devices and said digital video and audio recording and storage system.

16. A digital video and audio recording and storage process for installation in a mobile platform comprising the steps of:
collecting audio, video, data and meta-data information;
executing rules from a rules engine to monitor system operational parameters, perform system administration tasks, and record system alert indicators;
transforming audio, video, data and meta-data into digital format;
combining said transformed audio, video, data and meta-data into a single, integrated data stream;
storing said integrated data stream in a high-capacity digital data storage construct; communicating said integrated data stream to a computer server over wired or wireless communication means;
wherein said integrated data stream is continuously recorded and stored from the moment said process is initialized and wherein said integrated data stream is indexed for later retrieval and use in security and surveillance activities;
the recording step further comprising means for recording and storing said integrated data stream in a normal mode and an event mode wherein data storage files produced during normal mode recording and storage are smaller in size than data storage files produced during event mode recording and storage;
wherein said normal recording mode is the standard means for recording said integrated data stream during ongoing system operation;
means for recording said integrated data stream in event mode as a result of a trigger event;
means for continuing event mode recording until event mode is terminated as a result of reaching the end of a pre-set event trigger time period; and
wherein said pre-set event trigger time period is configurable.

17. A digital video and audio recording and storage process according to claim 16, the collecting process step further comprising:

means for collecting data including system status, maintenance data, operations data, alert data and indicator data;

means for collecting meta-data comprising analytic, telemetry, and function control data.

18. A digital video and audio recording and storage process according to claim 16, the executing rules step further comprising:

means for executing rules to create meta-data associated with analytic measurements from system operation, administration, and alert rules processing.

19. A digital video and audio recording and storage process according to claim 16, the transforming step further comprising:

means for transforming audio data from an analog input format into digital audio format by processing through an audio codec;

means for transforming video data from an analog input format into digital video format by processing through a DSP, and means for transforming meta-data into digital format wherein such meta-data is not already in digital format.

20. A digital video and audio recording and storage process according to claim 16, said communicating step further comprising:

means for streaming a live or stored integrated data stream to an external user over wired or wireless communication means.

21. A digital video and audio recording and storage process according to claim 20, the live streaming further comprising a set of function commands to setup, play, pause, and teardown the streaming session.

22. A digital video and audio recording and storage process according to claim 20, the stored streaming further comprising a set of function commands to retrieve and buffer stored video data wherein said function commands operate to provide a smooth display of said stored video data.

* * * * *